Sept. 15, 1925.
E. L. RIX ET AL
WIPER FOR OIL GAUGE RODS
Filed Nov. 24, 1923
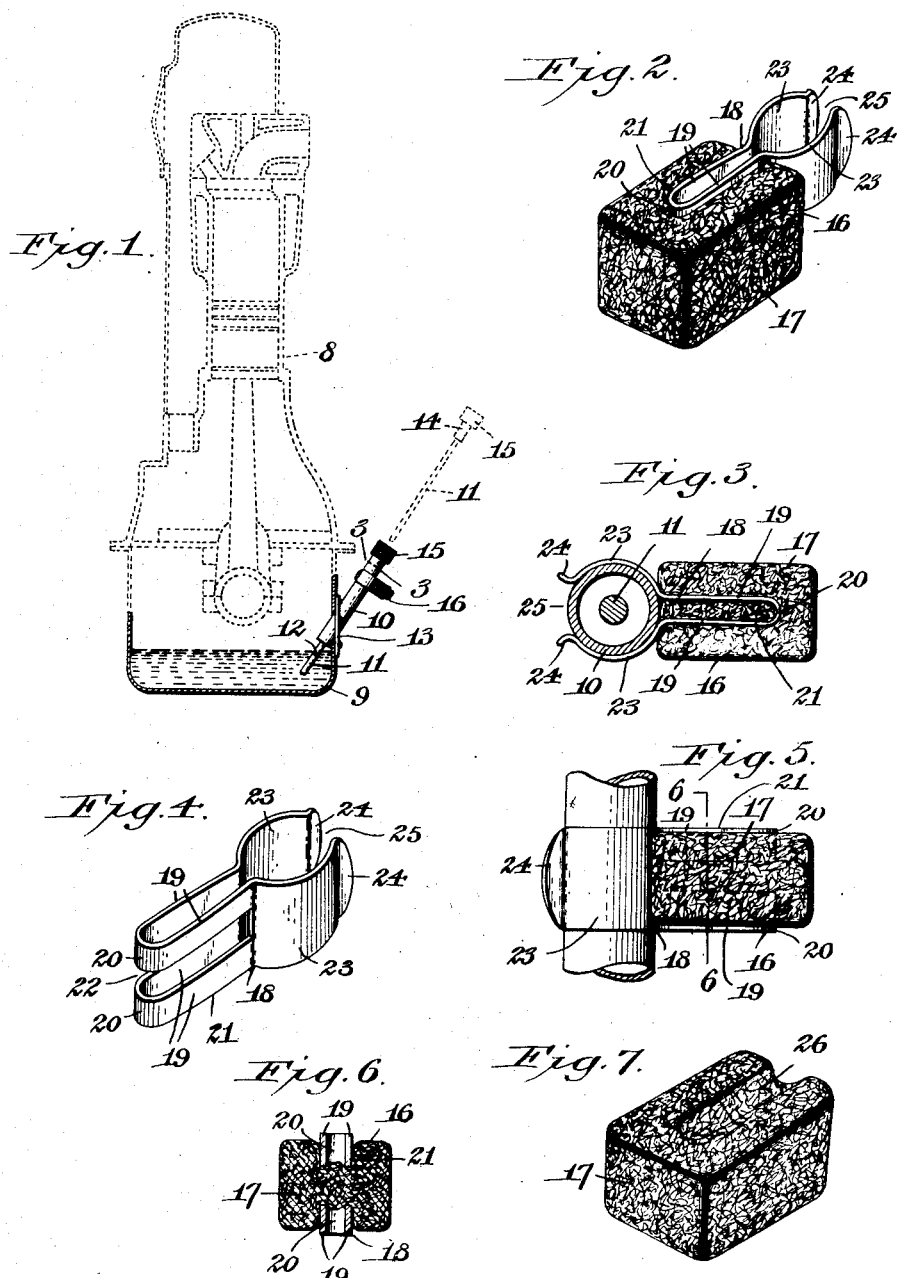

Patented Sept. 15, 1925.

1,553,915

UNITED STATES PATENT OFFICE.

ERNEST L. RIX AND ARLOND G. SAWIN, OF SILVER CREEK, NEW YORK.

WIPER FOR OIL-GAUGE RODS.

Application filed November 24, 1923. Serial No. 676,868.

*To all whom it may concern:*

Be it known that we, ERNEST L. RIX and ARLOND G. SAWIN, citizens of the United States, residing at Silver Creek, in the county of Chautauqua and State of New York, have invented certain new and useful Improvements in Wipers for Oil-Gauge Rods, of which the following is a specification.

Our invention relates to an improved wiper for oil gauge rods.

It is the purpose of our invention to provide a wiper for this purpose which will be kept conveniently at hand and one which is especially designed to be clipped onto the retainer or oil-test tube into which the oil gauge rod is inserted, although it may be clipped onto the frame work of the chassis or any other part of an automobile.

Another object of our invention is to provide a wiper of this kind which is comparatively small and includes in its structure a removable wiping pad which, when thoroughly saturated with oil, can be easily replaced with another pad and be cleaned in gasoline or some other cleansing fluid so that it can again be used.

A still further object is to provide a wiper of this kind which is simple, comparatively small and inexpensive and by means of which the oil gauge rod of an automobile can be conveniently and quickly freed of adhering oil.

With the above and other objects in view, the invention consists in the novel features of construction and in the arrangement and combination of parts to be hereinafter described and particularly pointed out in the subjoined claims.

In the drawings:—

Fig. 1 is a sectional view of the lower portion of an automobile engine having the upper portion of the engine shown in dotted lines and having said lower portion equipped with an oil-test tube in which an oil gauge rod is retained, said rod being shown projecting a distance beyond the inner or lower end of said tube and into the oil within the crank case of the engine.

Fig. 2 is a perspective view of our improved wiper.

Fig. 3 is an enlarged horizontal section taken on line 3—3, Fig. 1.

Fig. 4 is a perspective view of the metallic clip and pad-retaining portion of the device.

Fig. 5 is a side elevation of the device shown clipped onto the oil-test tube through which the oil gauge rod is passed.

Fig. 6 is a transverse section taken on line 6—6, Fig. 5.

Fig. 7 is a detached perspective view of the wiper pad, showing the same removed from the metallic clip and pad-retaining portion of the device.

Referring to the drawings in detail, the reference numeral 8 designates an automobile engine having at its lower end the crank case 9 in which oil is maintained, it being preferable to maintain the level of the oil above a certain height. In the side of this crank case is positioned a tube 10 which extends upwardly and outwardly, as clearly shown in Fig. 1, and may therefore be referred to as an obliquely-disposed retainer or oil-test tube, since in it is retained an oil gauge rod 11 which may have a mark 12 near its inner or lower end to determine the level at about which the oil should be maintained within said crank case. Said oil-test tube is shown projecting somewhat into the crank case, but this is not absolutely necessary so long as it opens into the crank case and the gauge rod enters the oil therein. In some automobiles, this tube extends into the crank case of the engine but does not project outwardly from the crank case.

In the drawings we have shown said oil-test tube provided with a securing flange 13 by means of which it is secured to the side wall of the crank case. The manner of securing this tube to the crank case varies in different automobiles and forms no part of our invention, and the tube and the oil gauge rod are parts of an automobile commonly in use and in connection with which our improved wiper may be used.

Illustrating by dotted lines in Fig. 1, a representative form of oil gauge rod, that shown has an enlarged portion 14 near its upper end, which is of a diameter to snugly fit within the upper end of the oil-test tube 10, and it also has a head 15 at its upper extremity which may be knurled or otherwise roughened so that it can be easily taken hold of, said head being against the outer end of said oil-test tube and by reason of its roughened periphery, enabling said oil gauge rod to be easily withdrawn from said tube. The construction of this oil gauge rod varies in different automobiles.

16 designates our improved wiper considered as a whole. It comprises a wiping pad 17 and a combined clip and pad retainer 18 formed of metal, preferably sheet brass. In constructing the clip and pad retainer, or the metallic body portion of the wiper, as it may be termed, a strip of brass, preferably rounded at its ends and provided with a longitudinal slot centrally between its ends, is bent or fashioned into the form shown in Fig. 4. More specifically stated, the strip is bent upon itself midway between its ends, and therefore midway between the ends of the longitudinal slot therein, forming two substantially parallel sides 19 joined together at corresponding ends by the curved portions 20. This portion of the device may be referred to as the pad retainer portion, which is designated by the numeral 21, as will appear more clearly hereinafter. This pad retainer portion may be said to comprise two elongated U-shaped portions separated by a transverse slot 22, which the longitudinal slot in the strip of material forms. The end portions of the strip of metal are concavo-convex in formation, as at 23, the length of the concavities and convexities being transversely of the strip of metal; and these concavo-convex portions are oppositely formed, the extremities of the metal being curved outwardly, as at 24, to provide a flaring entrance 25 for the receiving space between the two concavo-convex portions. Each of said concavo-convex portions connects corresponding outer ends of the two elongated U-shaped portions 19 together.

The wiping pad 17 is formed of felt or other suitable material and is substantially rectangular in formation. So formed it is easily compressible and inherently expansible, and by compressing it along a medial line, as indicated at 26, Fig. 7, the pad can be forced into the slot 22 of the pad retainer portion 21, the intermediate portion of the pad along most of its length being compressed between the two elongated U-shaped parts of said pad retainer portion, as clearly shown in Fig. 6, while the side portions of the pad retain their expanded condition. In this manner the wiper pad will be retained on the metallic portion of the device under all conditions of use.

The oppositely-disposed concavo-convex portions 23 form a substantially U-shaped clip which is adapted to be snapped onto the oil-test tube 10 of the engine, as clearly shown in Fig. 3, or onto any other part of the automobile conveniently near said tube, the flaring entrance 25 between the extremities of the device permitting said device to be easily snapped onto said tube or other convenient part of the automobile by merely pressing the outwardly curved extremities 24 against and over said tube; or part, as the case may be, and in order to remove the device it is simply necessary to grasp opposite edges of the pad retainer portion 21 and pull outwardly to compel the oppositely-disposed concavo-convex portions 23 to separate slightly.

The combined clip and pad retainer is preferably made of material possessing a certain degree of resiliency so that the clip portion thereof will return to normal condition when removed from or snapped onto the oil-test tube 10. After removing the device from said tube, the clip will serve as a handle, and by rubbing the wiper pad over the gauge rod, all oil will be removed from the latter, after which the rod may again be inserted into the crank case of the engine and the true level of the oil in said crank case ascertained when again removing said oil gauge rod. The wiper is snapped onto the oil-test tube 10 and retained thereon until it is again desired to ascertain whether or not the supply of oil in the crank case should be added to.

If desired, the oil gauge rod may be withdrawn from the oil-test tube and rubbed against the wiper while clamped to said tube or some other part of the automobile.

By the use of this device, a wiper is at all times conveniently at hand, thus eliminating the need of disturbing occupants in the car in order to gain access to a cloth, waste or other suitable material underneath a seat; and it also will save considerable time ordinarily wasted by an attendant looking for something suitable to wipe the rod which, as above stated, becomes covered with oil, during the operation of the engine, to a point considerably above that on the rod that would indicate the true level of the oil. Consequently, it is necessary to remove the oil from the rod and stop the engine so that when the rod is again inserted, the true level of the oil will show on the rod, and if the oil is indicated on the rod below the mark 12 thereon, it will show that additional oil is required in the crank case.

From the foregoing, the advantages of this device are quite apparent, and while we have shown a construction under the principle involved now believed to be highly efficient for the purpose intended, it is to be understood that changes may be made, falling within the scope of the appended claims, without departing from our invention or sacrificing any of the advantages thereof.

Having thus described our invention, what we claim is:—

1. A device of the kind described, comprising a metallic body portion formed of sheet metal bent upon itself between its ends and having a slot extending from its bent end inwardly, oppositely concaved portions adjacent one end of said slot, and a wiping pad compressed along a medial line and forced into said slot.

2. A device of the kind described, comprising a metallic body portion formed of a strip of metal bent between its ends and having at its free ends concavo-convex portions oppositely-disposed and a slot extending from the bent portion of said metal to said concavo-convex portions, and a wiping pad of felt compressed along a medial line from one end toward its other and inserted into said slot, said pad being retained in said slot by its inherent expansive qualities.

3. A device of the kind described, comprising a metallic body portion formed of sheet metal bent upon itself between its ends to provide two spaced members, said members having oppositely concaved portions at their free ends forming a clip to be snapped onto a supporting object, and a wiping element extending from said clip along said members and beyond the end thereof opposite said clip.

In testimony whereof we affix our signatures.

ERNEST L. RIX.
ARLOND G. SAWIN.